US007697230B2

(12) United States Patent
Fasen

(10) Patent No.: US 7,697,230 B2
(45) Date of Patent: Apr. 13, 2010

(54) TAPE DRIVE POSITION CONTROL

(75) Inventor: Donald Fasen, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/879,353

(22) Filed: Jul. 17, 2007

(65) Prior Publication Data

US 2009/0021855 A1 Jan. 22, 2009

(51) Int. Cl.
*G11B 21/04* (2006.01)
(52) U.S. Cl. .......................... 360/70; 360/71
(58) Field of Classification Search ....................... None
See application file for complete search history.

(56) References Cited

U.S. PATENT DOCUMENTS

| | | | | |
|---|---|---|---|---|
| 6,525,898 | B1 * | 2/2003 | Chliwnyj et al. | 360/77.12 |
| 6,563,659 | B1 * | 5/2003 | Fasen | 360/71 |
| 6,710,967 | B2 * | 3/2004 | Hennecken et al. | 360/77.12 |
| 2006/0245104 | A1 * | 11/2006 | Bui et al. | 360/69 |

* cited by examiner

*Primary Examiner*—Jason C Olson

(57) ABSTRACT

In one embodiment a tape drive system comprises a reel adapted to engage a tape cartridge, the tape cartridge comprising a tape media having a servo code written along a length of the tape media, a tape head comprising at least one servo element to detect the servo code, a drive assembly to induce relative motion between the tape and the tape drive, a servo system to control a rate of relative motion between the tape and the tape drive, wherein the servo system comprises a sampling module to sample servo code from the tape media and the sampling module implements a dithered sampling routine centered around a design sampling frequency.

20 Claims, 5 Drawing Sheets

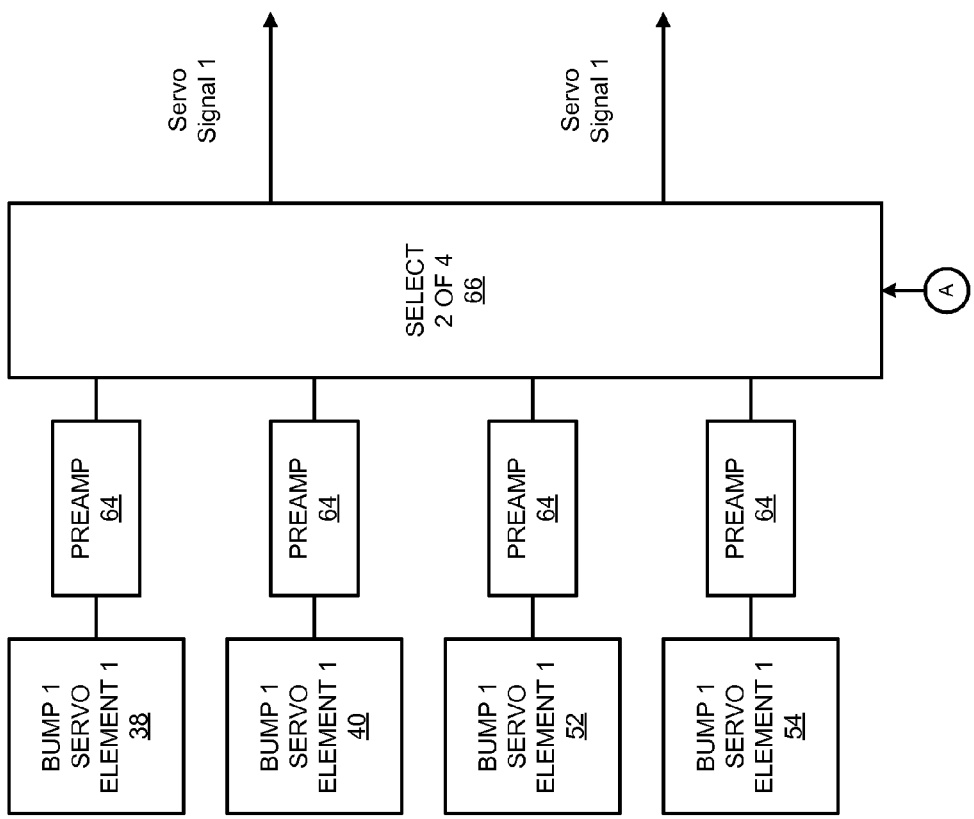

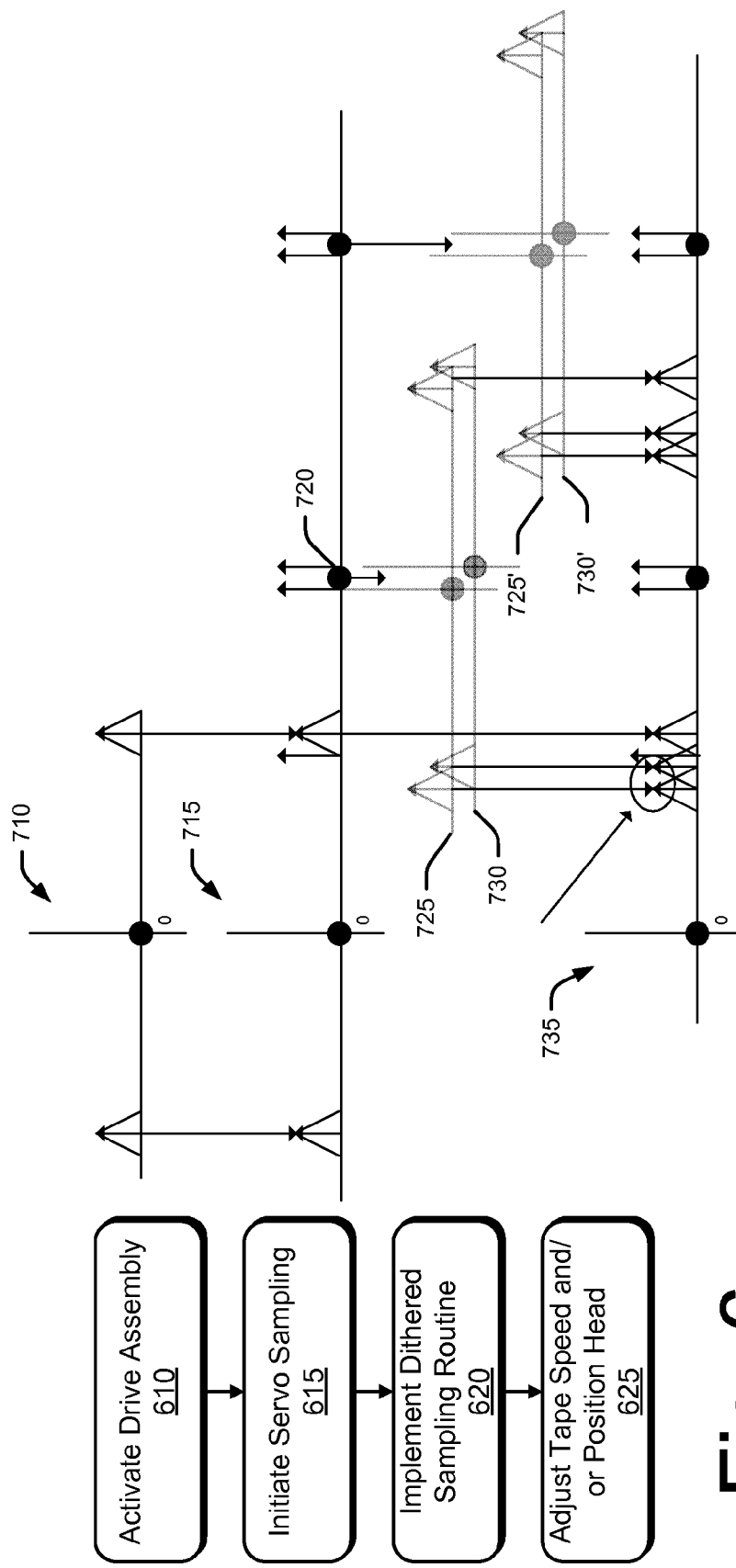

TAPE DRIVE POSITION CONTROL

BACKGROUND

The subject matter described herein relates to electronic computing, storage systems, and more particularly to tape drive position control.

Many magnetic tape storage systems implement a recording technology referred to as "linear recording" technology. Linear recording tape systems record information in multiple parallel tracks that extend in the direction of the length of the tape. Most, linear recording systems use a stationary tape head operating on tape that is driven past the tape head at a controlled speed. The tape head may employ multiple read/write elements that can operate simultaneously on the tape.

Continuing advances in magnetic storage technology provide for constantly increasing data storage densities. The more tracks that can be fit across the width of a tape, the more information that can be stored on a tape. Thus, there is a push to increase the number of tracks across the width of a tape and to reduce the width of each track. Increasing the number of tracks or reducing the width of a track makes accurate positioning of read/write elements, and issues of tape wander more important.

Servo control systems employ information or patterns recorded along a track of the tape to accurately position read/write elements relative to data on the tape. Servo patterns on a tape may include a characteristic that changes across the width of the tape. The servo information can be used to accurately position heads relative to the length of the tape (e.g., when searching for a desired position along the length of the tape, such as the start of a file) as well as relative to the width of the tape. Thus, as a servo element passes over the servo track, lateral position can be determined.

Servo control systems commonly implemented a sampling routine to collect position information from the servo patterns on a tape. In some instances, the sampling process can create images or aliases of signals from structural resonances. These images or aliases can cause undesirable instability and oscillations in the control routine implemented by the servo control system, thereby interfering with the control system's ability to position correctly the tape head with respect to that tape.

BRIEF DESCRIPTION OF THE DRAWINGS

FIG. 4-5 are block diagrams that provide schematic illustrations of a servo system including the servo elements of FIG. 2, according to embodiments.

FIG. 6 is a flowchart illustrating operations in a method to sample servo data from a tape media, according to embodiments.

FIG. 7 is a schematic illustration of the effect of the sampling technique implemented in FIG. 6, according to embodiments.

DETAILED DESCRIPTION

Figure 1:
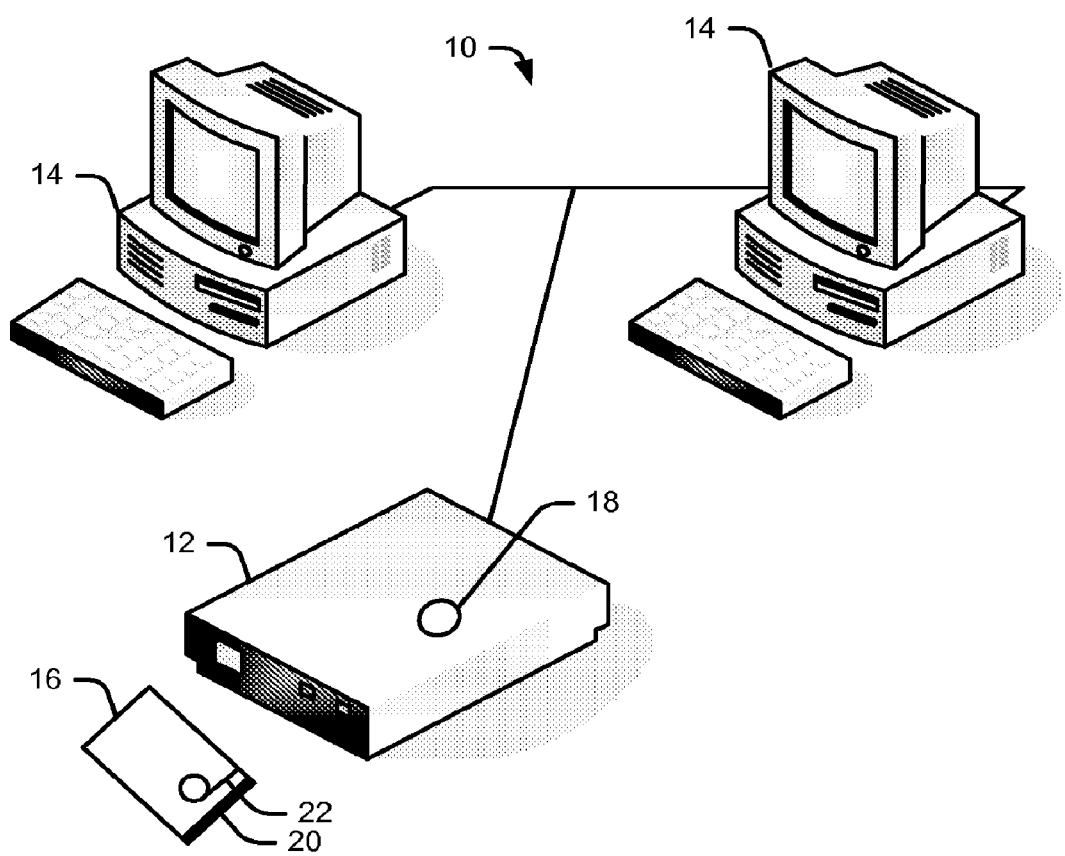
FIG. 1 is a schematic illustration of a computer network including a data storage device in which a dithered control rate may be implemented, according to embodiments.

FIG. 1 is a schematic illustration of a computer network including a data storage device in which a dithered control rate may be implemented, according to embodiments. FIG. 1 shows a computer network 10 including a data storage device or system 12 according to embodiments, and including one or more computers 14. The data storage device 12 reads data from and writes data to magnetic storage media. In one embodiment, the data storage device 12 is a stand alone tape drive. In another embodiment, the data storage device 12 is supported in a bay inside a housing of a computer 14 which forms a part of the network 10. In the illustrated embodiment, the data storage device 12 is a linear recording tape drive. Although the embodiments are illustrated as being employed in a computer data storing tape drive system in FIG. 1, the subject matter described herein has a wide variety of applications. For example, some aspects of the subject matter described herein can be used in connection with other storage media, for storing either analog or digital information. Some aspects of the subject matter described herein can be embodied, for example, in connection with any of a variety of types of storage devices, including disk storage devices. For purposes of illustration, the subject matter described herein will be described in connection with a computer tape drive.

The tape drive 12 is used with tape cartridges 16. In the illustrated embodiment, the tape cartridge 16 is a single reel type tape cartridge, and includes a reel 20, and tape 22 wound on the reel 20. A second reel 18 is included in the tape drive 12 and engages the tape 22. In an alternative embodiment, the tape cartridge 16 includes two reels. In the illustrated embodiment, the tape 22 has a width W of one half inch. The tape 22 also has a length in a direction perpendicular to the width W of the tape. A plurality of parallel tracks 24A, 24B, 24C, 24D, 24E, 24F, 24G, 24H, 24I, 24J, 24K, and 24L (24A-L) are defined across the width of the tape 22. The tracks 24A-L extend in the direction of the length of the tape 22.

The tape drive 12 includes a tape head 26 having a first bump 28 including a plurality of read/write elements 30, 32, 34, and 36 for reading data from or writing data to the tape in the parallel tracks 24, and a plurality of servo elements 38, and 40 for reading servo code from the tape in parallel bands 41A, 41B, 41C, and 41D different from the data tracks 24. In the illustrated embodiment, the servo code is pre-written to the parallel bands 41A, 41B, 41C, and 41D by another servo writer that may or may not be included in the tape drive 12. In another embodiment, the servo elements 38 and 40 are used for writing servo code to the parallel bands.

Figure 2:
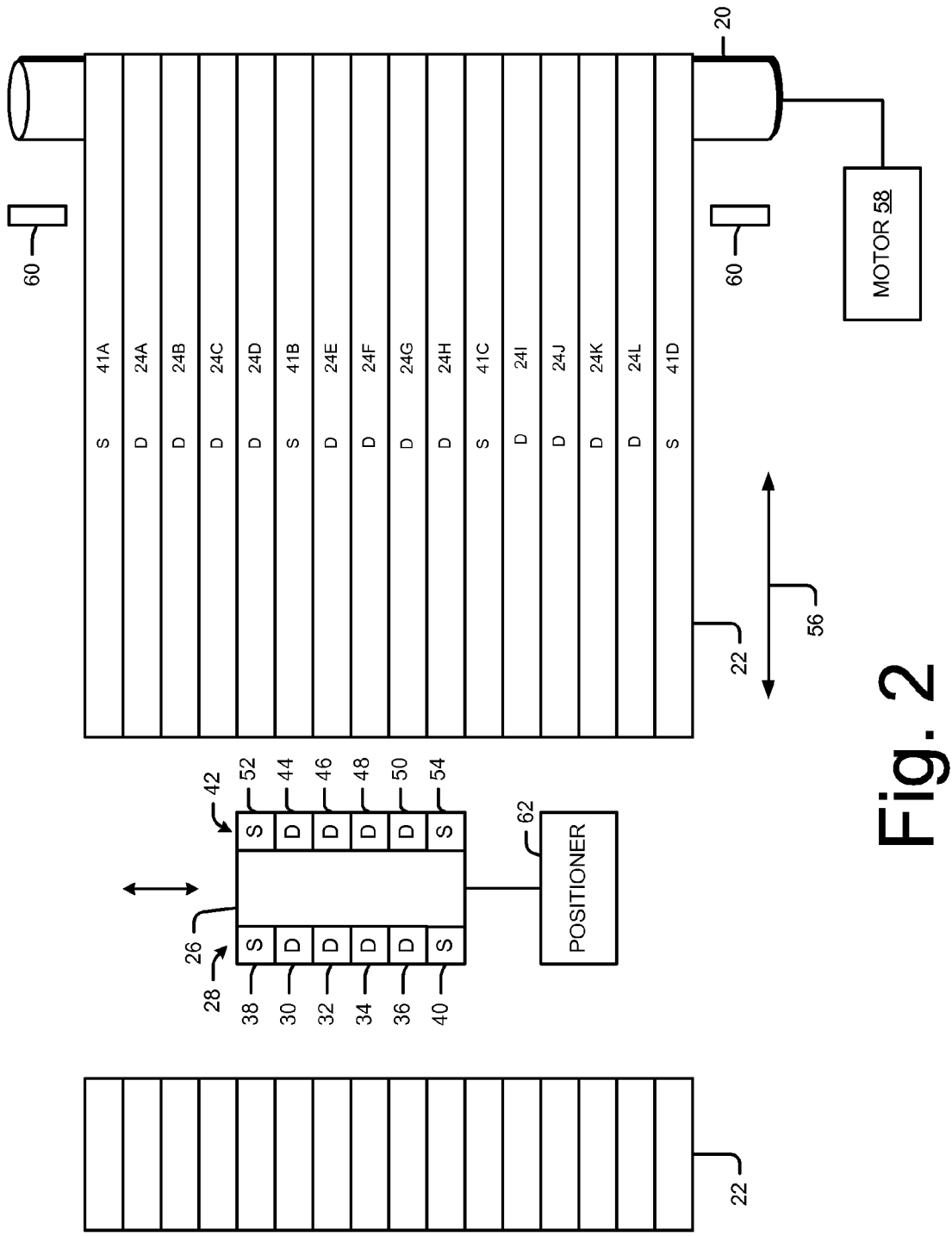
FIG. 2 is schematic illustration of an arrangement of servo elements and read/write elements on a head in a data storage device, and illustrating an arrangement of data tracks and servo bands on a magnetic recording medium on which the head operates, according to embodiments.

FIG. 2 is schematic illustration of an arrangement of servo elements and read/write elements on a head in a data storage device, and illustrating an arrangement of data tracks and servo bands on a magnetic recording medium on which the head operates. In FIG. 2, three sets of parallel data tracks are shown. However, various numbers of sets of data tracks can be employed. For example, in one embodiment, there are thirteen sets of data tracks, and an appropriate number of servo bands (e.g., with each of the thirteen sets of data tracks being located between two servo bands). Other numbers of sets can also be employed.

In the illustrated embodiment, the first bump 28 has four read/write elements, and two servo elements; however, in alternative embodiments, different numbers of read/write elements, or additional servo elements can be employed. In the illustrated embodiment, a "bump" is an area on the head having a column of (read/write and/or servo) elements. It is called a "bump" because it typically protrudes relative to the rest of the head. However, in the following disclosure and claims, the term "bump" is not to be construed so as to necessarily require protrusion relative to the rest of the head.

In FIG. 2, the read/write elements and servo elements are arranged with the four read/write elements 30, 32, 34, and 36, between the two servo elements 38 and 40. In the illustrated embodiment, the servo elements 38 and 40 are respectively of a physical construction identical to the physical construction of the read/write elements 30, 32, 34, and 36.

The tape head further has a second bump 42 including a plurality read/write elements 44, 46, 48, and 50 for reading data from or writing data to the tape in the parallel tracks 24, and two servo elements 52 and 54 for reading servo code from the tape in parallel bands. In the illustrated embodiment, the servo code is pre-written to the parallel bands 41A, 41B, 41C, and 41D by another servo writer that may or may not be included in the tape drive 12. In another embodiment, the servo elements 52 and 54 are used for writing servo code to the parallel bands.

In the illustrated embodiment, the second bump 42 has four read/write elements, and two servo elements; however, in alternative embodiments, different numbers of read/write elements, or additional servo elements can be employed.

The read/write elements 44, 46, 48, and 50, and servo elements 52 and 54 of the second bump 42 are arranged with the four read/write elements 44, 46, 48, and 50 of the second bump 42 between the two servo elements 52 and 54 of the second bump 42. The servo elements 52 and 54 of the second bump are respectively of a physical construction identical to the physical construction of one of the read/write elements 44, 46, 48, and 50.

The tape drive 12 is configured to drive the length of the tape 22 in either of a first and second direction relative to the head 26, as indicated by arrow 56. More particularly, the tape drive 12 includes at least one motor 58 which moves the tape 22 relative to the head 26. For example, in the illustrated embodiment, one motor 58 drives one of the reels 18 or 20, and another motor (not shown) drives the other of the reels 18 or 20. In an alternative embodiment, a capstan drives the tape. The tape drive 12 may include conventional components such as tapes guides 60.

In one embodiment, the servo and read/write elements of the second bump 42 are respectively parallel to the servo and read/write elements of the first bump 28, as shown in FIG. 2.

Figure 3:
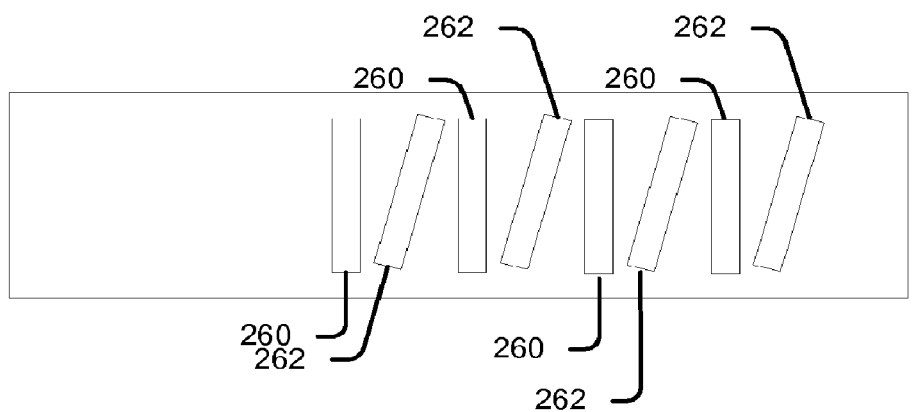
FIG. 3 is a schematic illustration of a servo band included in the magnetic recording medium shown in FIG. 2, according to embodiments.

FIG. 3 illustrates a servo band configuration that could be employed in one embodiment for a servo band 41A, 41B, 41C, or 41D. This servo band configuration is a servo band configuration which provides both an indication of position (and speed) in the direction of travel of the tape, and an indication of lateral position of the tape relative to the servo element reading the servo band. The tape drive 12 includes a timing based demodulation scheme for sensing the servo information on the tape. The position of the head 26 relative to the tape width is derived from the relative timing of azimuthally sloped transitions 260 and 262.

The tape drive 12 further includes a positioner 62 which is mechanically coupled to the head and positions or moves the head in the direction of the width of the head to move the head between various positions for reading or writing to different tracks. For example, in a first position, the servo element 38 is positioned to operate on the servo band 41A and the servo element 40 is positioned to operate on the servo band 41B; in a second position, the servo element 38 is positioned to operate on the servo band 41B and the servo element 40 is positioned to operate on the servo band 41C; and in a third position, the servo element 38 is positioned to operate on the servo band 41C and the servo element 40 is positioned to operate on the servo band 41D.

The positioner 62 also moves the head in the direction of the width of the tape to make minute corrections to ensure that the read/write elements are accurately positioned over desired tracks during reading or writing operations. In the illustrated embodiment, the positioner 62 comprises a voice coil motor; however, any other head positioner known in the art can be employed.

Figure 5:
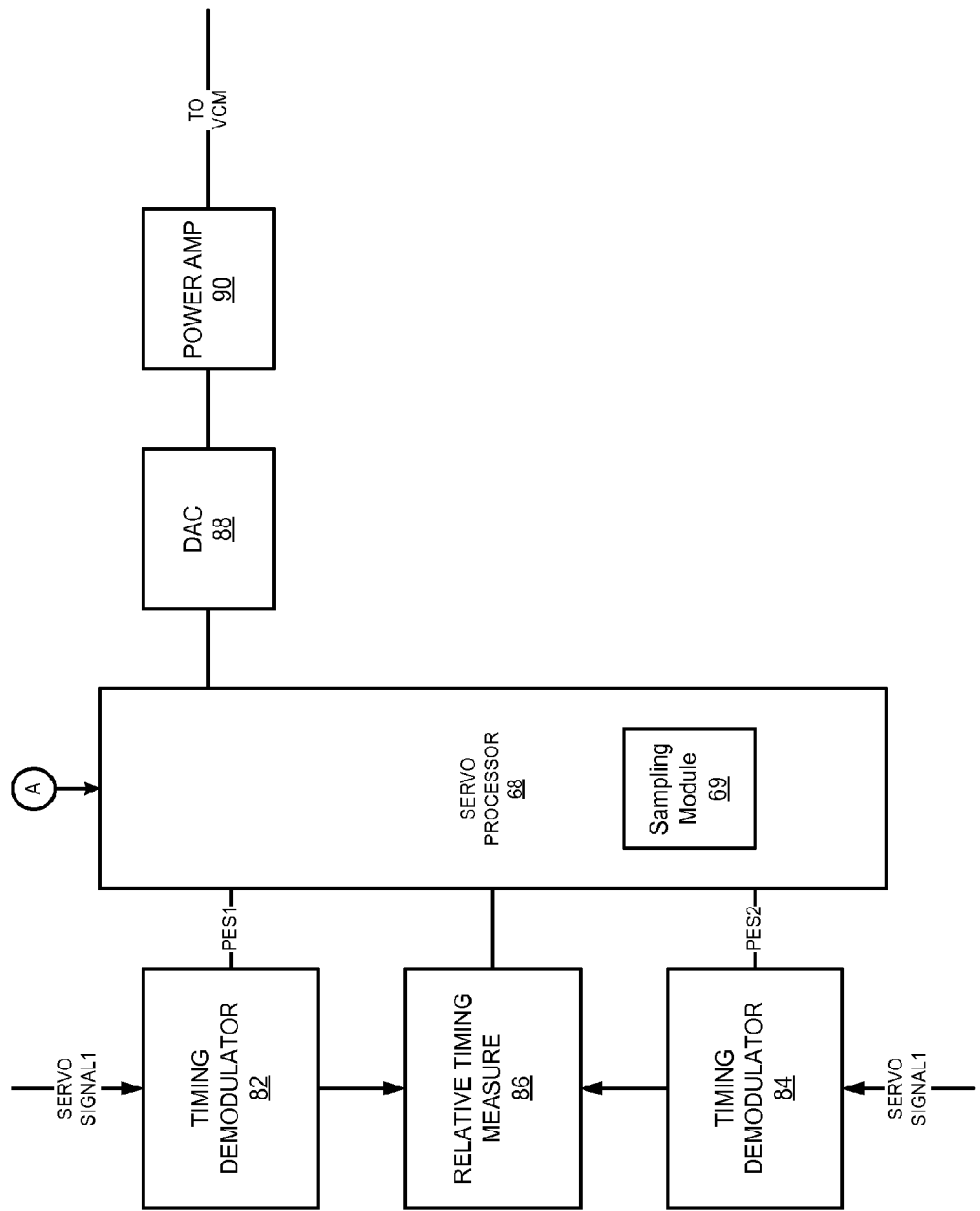

FIG. 4-5 are block diagrams that provide schematic illustrations of a servo system including the servo elements of FIG. 2. Referring to FIGS. 4-5, the tape drive 12 includes preamps 64 respectively coupled to the servo elements 38, 40, 52, and 54, and amplifying servo signals read by the servo elements which are reading servo code. This will be either the elements 38 and 40, or the elements 52 and 54, depending on the direction of tape travel, as described above. More particularly, the tape drive 12 includes a selection or switching circuit 66, coupled to the preamps 64, and enabling or using the preamps associated with the servo elements which are reading the servo code.

The tape drive 12 further includes a servo processor 68 which sends a selection control signal to the circuit 66 to select the appropriate pair of preamps depending on the direction of tape travel.

The tape drive 12 further includes timing demodulators 82 and 84 which receive timing signals "SERVO SIGNAL1" and "SERVO SIGNAL2" produced by the pulse detectors. The timing demodulators 82 and 84 produce respective position error signals PES1 and PES2 which are passed to the servo processor 68. The tape drive 12 further includes a relative timing measure circuit 86 coupled to the timing demodulators 82 and 84, and which determines the difference in timing error signals produced by the timing demodulators 82 and 84. This Delta Time signal is also passed to the servo processor 68. The servo processor 68 uses the signals from the timing demodulator 82, the timing demodulator 84, and the relative time measure circuit 86 to accurately position the head 26 over the tracks from which the read/write elements are reading or to which the read/write elements are writing. More particularly, the tape drive 12 includes a digital to analog converter 88 coupled to the servo processor and providing an analog signal. The tape drive 12 further includes a power amplifier 90 coupled to the digital to analog converter 88 and amplifying the analog output of the digital to analog converter to a value sufficient to drive the positioner 62. More particularly, in the illustrated embodiment, the power amplifier 90 is coupled to the voice coil motor.

Servo processor 68 may further include a sampling module 69 which implements a control sampling routine to read servo data from the tape. Operations implemented by sampling module 69 are discussed in greater detail below.

In some embodiments, a tape drive system as described herein may implement techniques to sample servo data from the tape media in a manner that reduces interference created by images or aliases of signals from structural resonances in the sampling process. For example, the sampling routine may utilize a dither, or time variation, in the control sample rate in order to de-tune the images or aliases from the residences, and thereby reduce or eliminate oscillations created by the residences.

One embodiment of a sampling process will be explained with reference to FIG. 6 and FIG. 7. FIG. 6 is a flowchart illustrating operations in a method to sample servo data from a tape media. In some embodiments, the operations depicted in FIG. 6 may be implemented by sampling module 69. Referring to FIG. 6, at operation 610 the tape drive assembly is activated such that relative motion is induced between a tape media in the tape drive and the tape head. For example, the tape drive assembly may be activated by activating motor 58 depicted in FIG. 2.

At operation 615 sampling of servo data on the tape media is initiated. For example, servo sampling may be initiated by activating one or more of the servo elements on the tape head to detect servo code on the tape media.

At operation 620, a dithered sampling routine is implemented. A servo sampling routine may be designed with a design sampling frequency, which may be designated $F_s$. In some embodiments, a dithered sampling routine involves fluctuating the sampling frequency with respect to the design sampling frequency. For example, in some embodiments a dithered sampling routine may comprise processing a plurality of control samples from servo code on a tape media at the first sampling frequency, then processing a plurality of control samples from servo code on the tape media at a second sampling frequency. Control samples may be processed for a predetermined period of time at the respective first and second sampling frequencies. Alternatively, a predetermined number of samples may be processed at the respective first and second sampling frequencies. Further, some embodiments may involve processing control samples at three or more frequencies that differ from a design sampling frequency. In general, a dithering sampling routine involves alternating between a first sampling frequency and a second sampling frequency, and possibly additional sampling frequencies centered around a design sampling frequency.

In one embodiment, the design sampling frequency is 8 kHz, the first sampling frequency is 7.2 kHz, and the second sampling frequency is 8.8 kHz (i.e., dithering occurs at 8 kHz+/−10%). Of course, those skilled in the art will understand that the design sampling frequency may differ from an 8 kHz frequency, and that the range of sampling frequencies may vary from those set forth herein.

At operation 625, the sampling data collected is used to adjust the tape speed or the tape head position. For example, the tape speed may be adjusted, alone or in combination with the tape head position, to more accurately position the tape drive head over the read/write tracks on the tape media, as described above.

FIG. 7 is a schematic illustration of the sampling technique implemented in FIG. 6. Referring to FIG. 7, electromechanical systems such as, for example, a disk drive assembly may have one or more inherent resonance frequencies indicated by $F_{res}$. Further, for each resonance frequency an opposing resonance frequency indicated by $-F_{res}$ exists. These resonance frequencies are indicated in the upper portion 710 of FIG. 7.

The middle portion 715 of FIG. 7 indicates a control sampling routine of an electromechanical system such as, for example, a tape drive assembly. Control sampling may be executed at a first sampling frequency $Fs_1$ and a second sampling frequency $Fs_2$, centered about a design frequency 720. In one embodiment, the design frequency 720 may be approximately 8 kHz, thus the Nyquist frequency is approximately 4 kHz. The first sampling frequency is slightly below the design sampling frequency and a second sampling frequency is slightly above the design sampling frequency.

Aliases of the resonance frequencies of the electromechanical system occur at each sampling frequency, and harmonics of the aliases occur at multiples of the sampling frequencies. Thus, a first alias 725 occurs at the first sampling frequency $Fs_1$ and a harmonic of the first alias 725' occurs at a multiple of two of the first sampling frequency ($2*Fs_1$). Similarly, a second alias 730 occurs at the first sampling frequency $Fs_2$ and a harmonic of the first alias 730' occurs at a multiple of two of the second sampling frequency ($2*Fs_2$).

While FIG. 7 depicts only two multiples of the sampling frequency, it will be understood that harmonics of the aliases continue to occur at further multiples of the sampling frequencies.

The lower portion 735 of FIG. 7 illustrates the effect of dithering the control sample. Dithering the control sample around a design frequency spreads the alias signals 725, 730, 725', and 730' across the resulting spectrum such that the signal strength of the alias signals 725, 730, 725', and 730' does not interfere with the sampling process or cause instability or oscillations in a control routine that utilizes the data collected by the sampling process.

The methods described herein may be embodied as logic instructions on a computer-readable medium. When executed on a processor, the logic instructions cause a general purpose computer device to be programmed as a special-purpose machine that implements the described methods. The processor, when configured by the logic instructions to execute the methods recited herein, constitutes structure for performing the described methods.

Reference in the specification to "one embodiment" or "an embodiment" means that a particular feature, structure, or characteristic described in connection with the embodiment is included in at least an implementation. The appearances of the phrase "in one embodiment" in various places in the specification are not necessarily all referring to the same embodiment.

What is claimed is:

1. A tape drive system, comprising:
   a reel adapted to engage a tape cartridge, the tape cartridge comprising a tape media having a servo code written along a length of the tape media;
   a tape head comprising at least one servo element to detect the servo code;
   a drive assembly to induce relative motion between the tape media and the tape head;
   a servo system to control a rate of relative motion between the tape media and the tape head, wherein
      the servo system comprises a sampling module to sample servo code from the tape media; and
      the sampling module is configured to implement dithered sampling centered around a design sampling frequency, wherein the dithered sampling comprises fluctuating a sampling frequency around plural frequencies centered around the design sampling frequency, where fluctuating the sampling frequency is independent of a speed of the tape media.

2. The tape drive system of claim 1, wherein the tape head comprises:
   a plurality of servo elements to detect the servo code on the tape media;
   a selection circuit to select inputs from a subset of the plurality of servo elements on the tape head;
   a circuit assembly to generate at least two servo signals.

3. The tape drive system of claim 2, wherein the servo system comprises:
   at least two timing demodulator circuits to receive the at least two servo signals and produce timing error signals from the servo signals;
   a relative timing measure circuit coupled to the at least two timing demodulator circuits to determine a difference in the timing error signals; and
   a servo processor to position the tape head based on the servo signals.

4. The tape drive system of claim 1, wherein the dithered sampling:

collects a plurality of control samples from servo code encoded on the tape media at a first sampling frequency; and collects a plurality of control samples from servo code encoded on the tape media at a second sampling frequency.

5. The tape drive system of claim 1, wherein the dithered sampling:
processes the plurality of control samples from servo code encoded on the tape media at a first sampling frequency that is below the design sampling frequency; and
processes the plurality of control samples from servo code encoded on the tape media at a second sampling frequency that is above the design sampling frequency.

6. The tape drive system of claim 5, wherein:
the design sampling frequency is approximately 8kHz;
the first sampling frequency is 7.2 kHz ; and
the second sampling frequency is 8.8 kHz.

7. The tape drive system of claim 1, wherein the dithered sampling alternates between sampling at a first sampling frequency for a predetermined period of time and a second sampling frequency for a predetermined period of time.

8. The tape drive system of claim 1, wherein the dithered sampling alternates between sampling at a first sampling frequency for a predetermined period of samples and a second sampling frequency for a predetermined number of samples.

9. The tape drive system of claim 1, wherein the dithered sampling alternates between three or more sampling frequencies centered about a design sampling frequency.

10. A method to monitor position information in a tape drive, comprising:
processing a plurality of control samples from servo code encoded on a tape media at a first sampling frequency; and
processing a plurality of control samples from servo code encoded on the tape media at a second sampling frequency,
wherein processing the plurality of control samples from the servo code encoded at the first and second sampling frequencies is part of dithered sampling that is independent of a speed of the tape media.

11. The method of claim 10, wherein collecting control samples from servo code encoded on the tape media comprises:
inducing relative motion between the tape media and a tape head; and
detecting the servo code with the tape head.

12. The method of claim 11 wherein:
processing the plurality of control samples from servo code encoded on the tape media at the first sampling frequency comprises collecting samples at the first sampling frequency that is below a design sampling frequency; and processing the plurality of control samples from servo code encoded on the tape media at the second sampling frequency comprises collecting samples at the second sampling frequency that is above the design sampling frequency.

13. The method of claim 12, wherein:
the design sampling frequency is approximately 8 kHz;
the first sampling frequency is 7.2 kHz; and
the second sampling frequency is 8.8 kHz.

14. The method of claim 13, further comprising:
alternating between the first sampling frequency and the second sampling frequency.

15. The method of claim 13, further comprising:
collecting a plurality of control samples from servo code encoded on the tape media at a third sampling frequency.

16. A computer program product comprising logic instructions stored on a computer readable medium which, when executed by a processor, configure the processor to:
process a plurality of control samples from servo code encoded on a tape media at a first sampling frequency; and
process a plurality of control samples from servo code encoded on the tape media at a second sampling frequency,
wherein processing the plurality of control samples from the servo code encoded at the first and second sampling frequencies is part of dithered sampling that is independent of a speed of the tape media.

17. The computer program product of claim 16, further comprising logic instructions stored on the computer readable medium which, when executed by the processor, configure the processor to:
collect samples at the first sampling frequency that is below a design sampling frequency; and
collect samples at the second sampling frequency that is above the design sampling frequency.

18. The computer program product of claim 17, wherein:
the design sampling frequency is approximately 8 kHz;
the first sampling frequency is 7.2 kHz; and
the second sampling frequency is 8.8 kHz.

19. The computer program product of claim 16, further comprising logic instructions stored on the computer readable medium which, when executed by the processor, configure the processor to:
alternate between the first sampling frequency and the second sampling frequency.

20. The computer program product of claim 16, further comprising logic instructions stored on the computer readable medium which, when executed by the processor, configure the processor to:
process a plurality of control samples from servo code encoded on the tape media at a third sampling frequency.

* * * * *